Sept. 29, 1959      G. W. BIERLY      2,906,362

CONTROL MEANS FOR SELF-PROPELLED MOWING MACHINES

Filed Aug. 27, 1957      2 Sheets-Sheet 1

INVENTOR.
GEORGE W. BIERLY
BY M. E. Frederick
attorney

Sept. 29, 1959 G. W. BIERLY 2,906,362
CONTROL MEANS FOR SELF-PROPELLED MOWING MACHINES
Filed Aug. 27, 1957 2 Sheets-Sheet 2
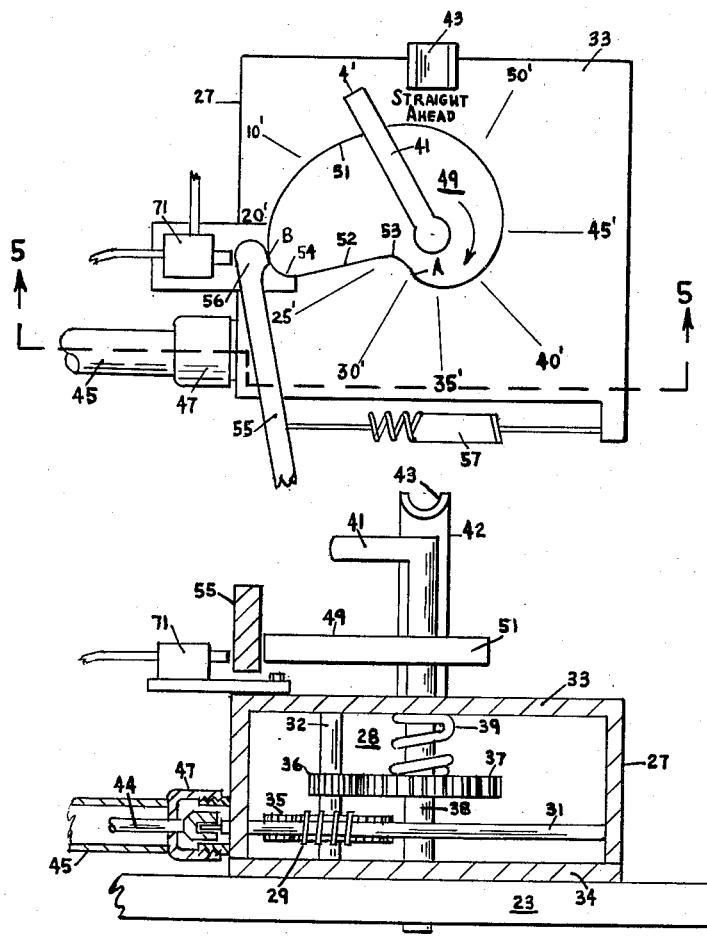
Fig 4
Fig 5
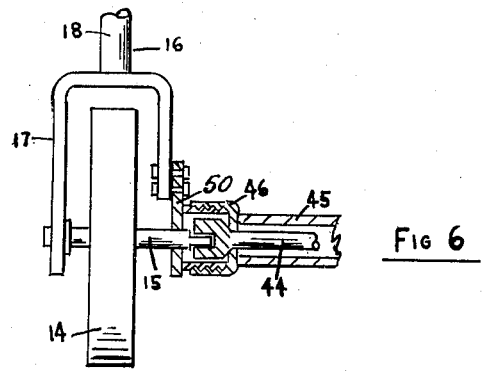
Fig 6
INVENTOR.
GEORGE W. BIERLY
BY M. E. Frederick
attorney

# United States Patent Office 2,906,362
Patented Sept. 29, 1959

2,906,362

CONTROL MEANS FOR SELF-PROPELLED MOWING MACHINES

George W. Bierly, Wilkes-Barre, Pa.

Application August 27, 1957, Serial No. 680,460

4 Claims. (Cl. 180—79.3)

This invention relates to mowing machines and more particularly to control means for self-propelled lawn mowers.

It is the principal object of the present invention to provide new and improved means for automatically controlling self-propelled mowing machines and the like.

Another object of the present invention is the provision of easily adjustable control means for a self-propelled lawn mower whereby the area of ground to be cut can be varied or the control means locked out entirely and the lawn mower controlled manually.

A further object of the invention is the provision of simple and dependable control means for a self-propelled lawn mower that is thoroughly reliable and efficient in operation, positive in action, strong, durable and inexpensive to manufacture.

Still another object of the invention is the provision of control means for a self-propelled lawn mower or the like wherein a steerable wheel drives a gear train and cam in a novel manner so that the lawn mower or the like follows a predetermined path to cover a selectable area.

These and other objects and features of the invention, together with their incident advantages, will be more readily understood and appreciated from the following detailed description of a preferred embodiment thereof selected for purposes of illustration and shown in the accompanying drawings in which:

Figure 4 is an enlarged top view showing the relation of the cam, steering arm, selector handle, and dial designating the diameter of area to be traversed.

Figure 5 is a vertical transverse sectional view taken on line 5—5 of Figure 4.

Figure 6 is a front view, partially in section, showing the steerable front wheel and the flexible power cable.

Figure 1:
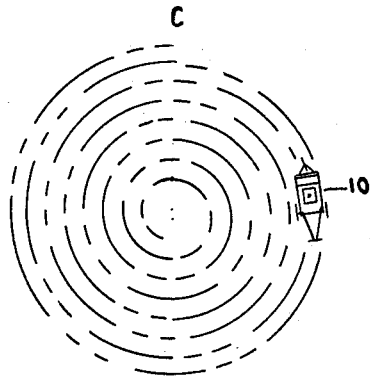
Figure 1 is a plan view of a typical path.

Referring to the drawings in detail, the invention as shown by way of example and for purposes of illustration is attached to and carried by a conventional rear wheel drive rotary type lawn mower 10 having a main body frame 11 supporting an internal combustion motor 12 for supplying the necessary motive power to the rear wheels 13 and a horizontally disposed cutter blade (not shown) mounted within the main body frame 11.

Figure 2:
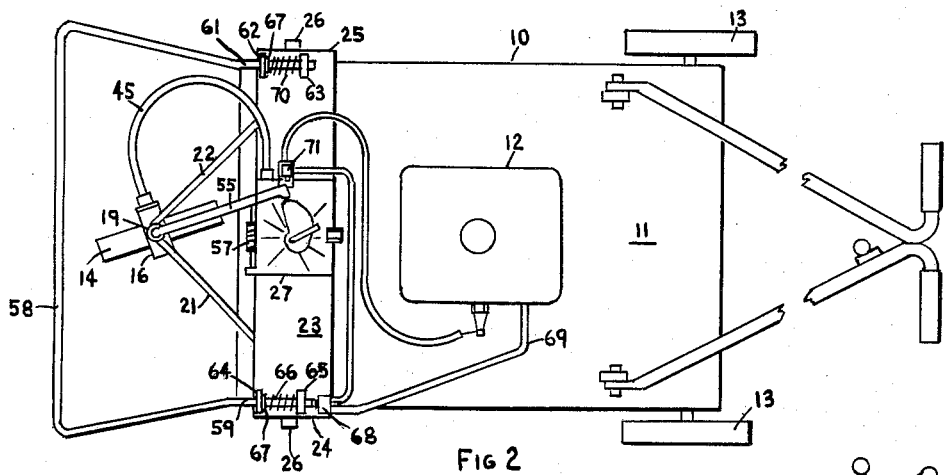
Figure 2 is a plan view of the invention mounted on a conventional rotary mower having a single steerable front wheel.
Figure 3:
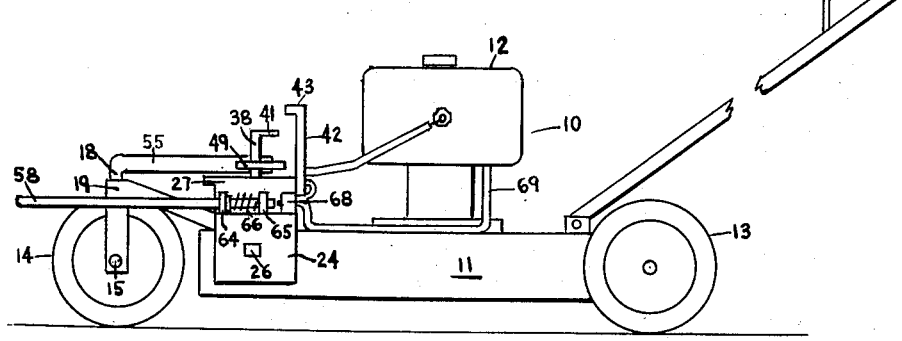
Figure 3 is a side elevation of the embodiment shown in Figure 2.

Arranged in advance of and along the longitudinal axis of the main body frame 11 is a pivotable steering wheel 14 supporting the front portion of the lawn mower. As best shown in Figures 2, 3, and 6, the steering wheel 14 is fixedly mounted on an axle 15 rotatably carried in a fork 16 comprised of a U shaped lower portion 17 disposed around the upper portion of the steering wheel 14 and a shaft 18 extending upwardly from and fixedly attached to the bight of the U shaped lower portion 17. The shaft 18 is journalled in a bearing 19 integral with and disposed at the apex of two supporting arms 21—22 rigidly attached to the front portion of the main body frame 11 and extending in an upwardly and forwardly direction such that steering wheel 14 may freely turn in any direction and the main body frame 11 is horizontally supported.

Although specific structure for supporting and locating the steering wheel has been described with reference to a conventional rotary type lawn mower it is to be understood, and as will readily become apparent hereinafter, that any suitable means may be utilized to pivotally support one or more steering wheels which may be affixed to the forward portion of a self-propelled vehicle such as for example a tractor, rotary type lawn mower and the like having three or more wheels or, alternately, affixed to the rear portion of self-propelled reel type lawn mowers and the like having a single set of wheels.

The front wheels conventionally provided on the rotary type lawn mower 10 shown and illustrated by way of example in Figure 2 and Figure 3 have been eliminated to facilitate steering and a transversely disposed base 23 having downwardly extending sides 24—25 is supported over and fixedly attached to the forward portion of the main body frame 11 as by bolts 26 or the like.

Fixedly attached to the base 23 rearwardly of and in substantial longitudinal alignment with the steering wheel 14 is a gear box 27 enclosing and protecting a gear train 28 for driving direction selecting means at the requisite speed for proper control of the mower. Rotatably journalled and protected within the gear box 27 is a worm gear 29 fixedly mounted adjacent the end of a shaft 31 projecting horizontally outward through one side of the gear box 27. A vertically disposed shaft 32 is rotatably mounted in the top wall 33 and bottom wall 34 of the gear box 27 and is provided with a gear wheel 35 in driven engagement with the worm gear 29. A smaller spur gear 36 is disposed on the shaft 32 above the gear wheel 35 such that the spur gear 36 is in driving engagement with a second and larger spur gear 37 fixedly carried on a vertical shaft 38 extending through and past the upper and lower walls 33—34 of the gear box 27 and longitudinally movable in an upwardly direction from its normal operative position. A spring 39 is provided on the shaft 38 between the second spur gear 37 and the upper wall 33 of the gear box 27 to urge the shaft 38 toward its normal down position and maintain the spur gears 36—37 in engagement. Provided at the upper end of the shaft 38 and integral therewith is a horizontally disposed selector handle 41. An upstanding L shaped fixed support 42 having a forwardly extending annular recess or groove 43 in its upper surface located above and adapted to receive the selector handle 41 is disposed and arranged in longitudinal alignment rearwardly of the shaft 38 such that when the selector handle 41 is in its down position it will not come in contact with the support 42, but such that when the selector handle 41 is raised and placed in the annular recess 43 it will be held in a fixed position therein by the upwardly extending lips of the recess 43 and the spring 39.

The shaft 38 extends through the bottom wall 34 of the gear box a sufficient distance to allow the selector handle 41 to be raised to a point above the annular recess 43 to allow placement therein of the selector handle 41. When the selector handle 41 is partially raised the spur gears 36—37 will be disengaged and the selector handle 41 is rotatable to any radial position that may be desired and hence may be easily and quickly placed in the annular recess 43 by simply lifting it further and placing it in the recess. When the selector handle 41 is in the annular recess 43 the spring 39 functions to assist in maintaining it in this position and when the selector handle 41 is in its normal operative down position the spring 39 functions to maintain the spur gears 36—37 in operative engagement.

The gear train 28 as described hereinabove is driven by rotation of the steering wheel 14 through a relatively long flexible power cable 44 carried within a flexible housing 45 removably connected respectively to the fork 16 and gear box 27 as by threaded end portions 46—47 to maintain the power cable 44 in removable power transmitting connection with the steering wheel axle 15 and the worm gear shaft 31.

To facilitate removal and/or repair of the steering wheel 14 a removable plate 50 forms the lower portion of one leg of the fork 16 to support one end of the steering wheel axle 15 and to which the cable housing 45 is attached.

Disposed on the shaft 38 intermediate the selector handle 41 and the top wall 33 of the gear box 27 is a flat eccentric cam 49 in fixed radial relationship with the selector handle 41 as pointed out hereinbelow. The cam 49 is formed such that as one progresses in a radial direction around the longitudinal axis of the shaft 38 each point on the majority of the periphery 51 of the cam 49 from about point A to point B is progressively located a greater distance from the longitudinal axis of the shaft 38. A flat surface 52 concave at its inner end portion 53 and convex at its outer end portion 54 to present a smooth and unbroken surface connects points A and B on the cam 49. Integral with the steering wheel shaft 18 is a rigid steering arm 55 having an end portion 56 dimensioned such that it is maintained in continuous abutting relationship with the outer periphery 51 of the cam 49 by a spring 57 or the like irrespective of the radial or vertical position of the cam. The cam 49 is radially and fixedly disposed on the shaft 38 as by welding or the like such that when the selector handle 41 is in substantial alignment with the annular recess 43 the rear portion 56 of the steering arm 55 will be disposed between the inner curved portion 53 of the cam periphery and point A. In view of the foregoing discussion and by reference to Figure 4 it may be readily noted that when the steering arm 55 is in the position indicated immediately hereinabove the steering wheel 14 will be directed straight ahead.

With reference now to Figure 2 and Figure 3, a generally U shaped bumper 58 extending forwardly of and around the steering wheel 14 and movable in a rearwardly direction is provided such that the leg portions 59—61 are slidably supported by and pass through upwardly projecting ears 62—63—64—65 located at the oppositely disposed outer edges of the base 23. Springs 66—70 are carried respectively on each leg 59—61 intermediate each rearmost ear 65—63 and a projection 67 integral with each leg and respectively in abutting relationship with the rear surface of each foremost ear 64—62 to urge the bumper 58 in a forwardly direction. When the bumper 58 contacts an object such as a tree or the like the springs 66—70 allow the bumper 58 to move rearwardly to actuate a switch 68 in the ignition system 69 and stop the motor 12. A second switch 71 is provided in the ignition system 69 in series with the previously mentioned switch 68 such that it is actuated and stops the motor 12 when the steering wheel 14 is pivoted to a predetermined or maximum turning position, such as for example when the cam 49 and steering arm 55 are in the position as shown in Figure 4.

Figure 1 shows a typical path that the lawn mower will follow when utilizing the embodiment shown and described herein, operation of the lawn mower 10 beginning at point C and traveling in a constantly decreasing circle until it reaches its maximum turning radius at which time the motor will be stopped as discussed hereinabove.

It may now be apparent from the foregoing discussion that as the steering wheel 14 is rotated during operation of the lawn mower 10 the gear train 28 is driven through the flexible power cable 44 causing the direction selecting cam 49 to rotate in a clockwise direction as shown in Figure 4. As the cam rotates the movement of its peripheral surface 51 causes the rear portion 56 of the steering arm riding thereon to be continuously moved away from center thereby causing the steering wheel 14 to be pivoted at the proper rate so that the lawn mower will follow a constantly decreasing radius or spiral path as shown in Figure 1.

In the construction of the present invention it will be apparent to those skilled in the art that the determination of the proper rate of displacement of the steering wheel from a straight ahead position is dependent upon such factors, for example, as the revolutions per minute of the power cable, the reduction ratio of the gear train and the size and configuration of the direction selecting cam, as well as the length of the steering arm. These factors, generally referred to immediately hereinabove, are mutually interdependent and variable and are also dependent upon the size, type, and operation of the machine to be controlled; hence no specific limitations are recommended since they may be determined by conventional machine design procedures to meet the requirements of a specific situation or the preference of the user.

The provision of the selector handle and cam as described hereinabove is peculiarly adapted to allow convenient and simple selection of any diameter of area to be cut from, for example, about fifty feet or more to about four feet or less, depending upon the particular design factors selected. The numbers on the upper surface of the gear box shown in Figure 4 represent the diameter of the circular area the mower will cut from a maximum diameter to a minimum diameter. The selector handle 41 may be positioned to correspond with the diameter desired by merely lifting the selector handle, which disengages the spur gears 36—37, and rotating the handle to the desired position. Further, the mower can be quickly and simply adapted for manual operation by lifting the selector handle 41 and placing it in the annular recess or groove 43. When the selector handle 41 is in the straight ahead position in groove 43 (see Figure 4) the spur gears 36—37 are disengaged and the steering arm 55 is maintained in the proper position by the cam 49 and spring 57 as previously pointed out hereinbefore.

It may now be obvious that an automatic and adjustable steering mechanism constructed in accordance with the teachings hereinabove is of maximum simplicity, dependability and versatility. The costs of production and maintenance are therefore very low and the invention may be easily adapted for use with substantially any self-propelled mowing machine for mowing lawns and fields or with tractors and the like for cultivating, harrowing, and dragging fields.

While I have shown and described a specific and preferred embodiment of my invention it is to be understood that I do not limit myself to the exact details of construction shown and described and that the scope of the invention embraces such changes, modifications, and equivalents of parts and their formation and arrangement as come within the purview of the appended claims.

What I claim and desire to secure by Letters Patent of the United States is:

1. In automatic steering means for self-propelled mowing machines the combination comprising: a wheel pivotally affixed to said mowing machine; a gear train, said gear train comprisng a first gear, a shaft movable along its longitudinal axis and having a first position and a second position, a second gear mounted on said shaft and in driven relationship with said first gear when said shaft is in its said first position; means responsive to the movement of said mowing machine for driving said gear train comprising means adapted and disposed to drive said first gear and a flexible cable having a first end rotatably driven by said wheel and a second end rotatably driving said means; a cam fixedly mounted on said shaft, said cam having a periphery the majority of which is disposed at a substantially continuously increasing distance from said shaft; means to maintain said cam in a fixed position when said shaft is in its said second position; and a rigid arm having a first end portion operatively associated with said wheel and a second end portion disposed in continuous abutting relationship with the periphery of said cam whereby a change in the axial position of the cam results in a change in the axial position of said wheel.

2. Means for steering a self-propelled mowing machine comprising: a wheel pivotally affixed to said mowing machine; a gear train, said gear train comprising a first gear and a second gear movable with respect to said first gear; means responsive to the movement of said mowing machine for driving said gear train; lever means for pivoting said steering wheel; direction selecting means actuated by said second gear operatively associated with said lever means for directing said mowing machine in a constantly decreasing circular path; and locking means to maintain said second gear away from said first gear including a substantially horizontally disposed arm fixedly connected to said second gear and a support adapted to receive and maintain said arm in a fixed position for straight ahead travel.

3. Means for steering a self-propelled mowing machine comprising: a wheel pivotally affixed to said mowing machine; a gear train, said gear train comprising a first gear and a second gear movable with respect to said first gear; means responsive to the movement of said mowing machine for driving said gear train; lever means for pivoting said steering wheel; direction selecting means actuated by said second gear operatively associated with said lever means for directing said mowing machine in a constantly decreasing circular path; and locking means to maintain said second gear away from said first gear including a projection fixedly connected to said second gear and a support adapted to receive and maintain said projection in a fixed positon for straight ahead travel.

4. Means for steering a self-propelled mowing machine comprising: a wheel pivotally affixed to said mowing machine; a gear train, said gear train comprising a first gear and a second gear movable with respect to said first gear; means responsive to the movement of said mowing machine for driving said gear train including a worm gear adapted and disposed to drive said first gear and a flexible cable having a first end rotatably driven by said wheel and a second end rotatably driving said worm gear; lever means for pivoting said steering wheel; and a rotatable cam having a periphery the majority of which is spiral shaped actuated by said second gear and operatively associated with said lever means for directing said mowing machine in a constantly decreasing circular path.

References Cited in the file of this patent
UNITED STATES PATENTS

| | | |
|---|---|---|
| 1,570,547 | Avera | Jan. 19, 1926 |
| 2,674,332 | Ovshinsky | Apr. 6, 1954 |
| 2,751,030 | Null | June 19, 1956 |